United States Patent
Celerier

(10) Patent No.: US 9,573,703 B2
(45) Date of Patent: Feb. 21, 2017

(54) PROPULSION SYSTEM FOR CONTROLLING THE ORBIT AND CONTROLLING THE ATTITUDE OF A SATELLITE

(71) Applicant: THALES, Neuilly-sur-Seine (FR)

(72) Inventor: Bruno Celerier, Auribeau sur Siagne (FR)

(73) Assignee: THALES, Courbevoie (FR)

( * ) Notice: Subject to any disclaimer, the term of this patent is extended or adjusted under 35 U.S.C. 154(b) by 594 days.

(21) Appl. No.: 13/902,678

(22) Filed: May 24, 2013

(65) Prior Publication Data

US 2013/0313369 A1   Nov. 28, 2013

(30) Foreign Application Priority Data

May 25, 2012   (FR) ...................... 12 01504

(51) Int. Cl.
| | |
|---|---|
| *B64G 1/40* | (2006.01) |
| *B64G 1/24* | (2006.01) |
| *B64G 1/26* | (2006.01) |
| *F02K 9/84* | (2006.01) |
| *B64G 1/28* | (2006.01) |
| *B64G 1/36* | (2006.01) |

(52) U.S. Cl.
CPC .................. *B64G 1/242* (2013.01); *B64G 1/26* (2013.01); *F02K 9/84* (2013.01); *B64G 1/283* (2013.01); *B64G 1/286* (2013.01); *B64G 1/288* (2013.01); *B64G 1/365* (2013.01); *F05D 2270/12* (2013.01)

(58) Field of Classification Search
CPC ............. F02K 9/84; B64G 1/242; B64G 1/26; F05D 2270/12
See application file for complete search history.

(56) References Cited

U.S. PATENT DOCUMENTS

| | | | | |
|---|---|---|---|---|
| 3,662,973 A | * | 5/1972 | Paine .................... | B64C 39/026 244/1 R |
| 4,955,559 A | * | 9/1990 | Kaminskas .............. | B64G 1/26 244/169 |
| 5,349,532 A | * | 9/1994 | Tilley ....................... | B64G 1/26 244/164 |
| 6,032,904 A | * | 3/2000 | Hosick .................... | B64G 1/26 244/169 |
| 6,296,207 B1 | * | 10/2001 | Tilley .................... | B64G 1/242 244/165 |

(Continued)

FOREIGN PATENT DOCUMENTS

EP    0937644 A2    8/1999

*Primary Examiner* — Philip J Bonzell
(74) *Attorney, Agent, or Firm* — Baker & Hostetler LLP

(57) ABSTRACT

A propulsion system for controlling the orbit of a satellite in earth orbit comprises a thruster suitable for delivering a force along an axis F, and a motor-driven mechanism linked on the one hand to the thruster and on the other hand to a structure of the satellite, said motor-driven mechanism being suitable for displacing the thruster on either side of the plane of the orbit and suitable for orienting the thruster so as to make it possible to control a component perpendicular to the orbit of the force in two opposite directions, to control the inclination of the satellite, and in that said motor-driven mechanism is suitable for displacing the thruster along an axis V parallel to the velocity of the satellite, and suitable for orienting the thruster so as to make it possible to control a component of the force on the axis V, to control orbit.

11 Claims, 7 Drawing Sheets

(56) References Cited

U.S. PATENT DOCUMENTS

| | | | | |
|---|---|---|---|---|
| 6,565,043 B1 * | 5/2003 | Wittmann | ............... | B64G 1/242 244/169 |
| 8,226,046 B2 * | 7/2012 | Poulos | .................... | B64G 1/646 244/158.1 |
| 8,628,044 B2 * | 1/2014 | Poulos | .................... | B64G 1/646 244/158.1 |
| 2011/0121139 A1 * | 5/2011 | Poulos | ................. | B64G 1/1078 244/169 |
| 2012/0286098 A1 * | 11/2012 | Poulos | .................... | B64G 1/646 244/158.1 |

* cited by examiner

PROPULSION SYSTEM FOR CONTROLLING THE ORBIT AND CONTROLLING THE ATTITUDE OF A SATELLITE

CROSS-REFERENCE TO RELATED APPLICATION

This application claims priority to foreign French patent application No. FR 1201504, filed on May 25, 2012, the disclosure of which is incorporated by reference in its entirety.

FIELD OF THE INVENTION

The present invention relates to the field of satellite orbit control and attitude control systems, and more particularly the architecture of the onboard propulsion systems for controlling the orbit of geostationary telecommunications satellites.

BACKGROUND

For the various mission instruments of a satellite, such as the telecommunication systems, to be used, the position and the orientation of the satellite in orbit need to be controlled. In addition to the earth's gravity, a satellite is subject to a number of lower amplitude forces which progressively modify its position and its orientation. The gravity of the sun and of the moon, the deformation of the earth at the equator, or even the solar radiative pressure generate drifts which have to be corrected. Control systems are implemented to maintain, on the one hand, the orientation of the satellite relative to the earth, i.e. attitude control, and on the other hand its position in orbit relative to a desired ideal position, i.e. orbit control.

For example, in the case of geostationary satellites, orbit control seeks to limit the inclination relative to the equatorial plane, to limit the eccentricity of the orbit, and to limit the drift of the longitudinal position of the satellite relative to the earth. For this, thrusters are positioned at various points on the satellite to correct the trajectory at fairly close intervals by applying a force to the satellite. These station keeping operations require the capability to have a sufficient reserve of propellant throughout the life of the satellite. To limit the cost and the weight of the orbit control devices, a novel architecture of the propulsion systems is envisaged.

A satellite is placed in orbit by a combination of a space launch vehicle and its own propulsion systems. The launch vehicle transports and releases the satellite on a first so-called transfer earth orbit, the perigee of which is generally low; once on this first orbit, a propulsion system of the satellite takes over to transport the satellite to its final orbit. Generally, this transfer is performed by means of a main satellite thruster PSP consuming a chemical propellant of ergol or propergol type, delivering a high-power thrust in order to rapidly reach the final orbit.

Once on station, a plurality of lower power secondary thrusters ensure that the satellite is held in position on the orbit. For this, ergol chemical thrusters or electrical thrusters can be used. In an electrical thruster, of plasma thruster or ion thruster type, xenon atoms are ionized by collision with electrons, creating xenon ions. The thrust is generated when the charged xenon ions are accelerated out of the thruster by an electromagnetic field. Although costly and initially very heavy, the effectiveness of the thruster, or its capacity to generate force by mass ejection, also called specific impulse, is substantially greater than that of the chemical thrusters.

In the known systems, chemical thrusters and electrical thrusters are positioned in a number of positions on the structure of the satellite in order to meet all the needs of the mission, from transporting from the transfer orbit to maintaining in orbit throughout the life of the satellite. The propulsion systems thus implemented have the drawback of a high cost and the high weight of the various thrusters and of the propellant. These drawbacks limit the payload installation capacity of the satellite.

According to the known state of the art, an orbit control system seeks to control the position of the satellite through six orbital parameters. FIG. 1 represents a geostationary satellite 10 in orbit 11 around the earth 12. The orbit 11 is inclined by an angle $\theta$ relative to the equatorial plane 13 which contains the ideal geostationary orbit 14. The orbit 11 of the satellite intersects the equatorial plane 13 at two points 15 and 16, commonly called orbital nodes. The six orbital parameters used to qualify the position of a satellite are also known: the semi-major axis, the eccentricity, the inclination, the argument of the ascending node, the argument of perigee and the true anomaly. Orbit control entails quantifying these orbital parameters and carrying out the necessary operations by means of the onboard propulsion systems, to hold the satellite within a predefined area around an ideal position. As an example, for a geostationary satellite, a drift window of plus or minus 0.1°, representing a width of nearly 150 km, is assigned around a target position.

A current architecture of a satellite 10, as represented in FIG. 2, comprises a parallelepipedal structure 20 on which are fastened various devices useful to the piloting of the satellite 10 and to its mission. Telecommunications instruments 21 are installed on one face 22 whose orientation is kept facing the earth, commonly called earth face. On an opposite face 23, commonly called anti-earth face, the main satellite thruster PSP is positioned notably ensuring the thrust needed for the transfer from the low orbit to the final orbit. On two opposing lateral faces 24 and 25, commonly called north face and south face, because of their orientation relative to the equatorial plane, two sets of solar panels 26 and 27 are positioned, supplying electrical energy to the onboard systems. Various devices can be installed on the lateral faces 28 and 29, commonly called east face and west face for their orientation relative to a terrestrial longitude. Maintaining a constant orientation of the satellite relative to the earth is necessary for the mission of the satellite to run correctly, for example for the orientation of the solar panels 26 and 27 or the pointing of the telecommunication systems 21 towards the earth. This is handled by means of an attitude control system. A number of attitude control systems, suitable for detecting and correcting orientation errors, are known. Thus, the orientation of the satellite can be measured by means of a sensor assembly, comprising, for example, a sensor directed towards the earth, positioned facing the earth for a measurement on two axes, pitch and roll, relative to the earth and a set 30 of gyroscopes for detecting rotation speeds on three axes. From these measurements, corrections to the orientation of the satellite about its centre of gravity can be made, for example by means of inertia wheels 31 or of gyroscopic actuators.

A satellite equipped with such a system for controlling attitude is said to be stabilized on three axes. Typically, by controlling the speed of rotation and the orientation of the inertia wheels, an orientation error can be corrected within a reference trihedron linked to the satellite. Hereinafter, Z will be used to denote an axis directed towards the earth, also called yaw axis, Y will be used to denote an axis perpendicular to the orbit and oriented in the direction opposite to the kinetic moment of the orbit (towards the south for a geostationary), also called pitch axis, and X will be used to denote an axis forming, with Y and Z, a direct orthogonal reference frame, also called roll axis, which is oriented according to the velocity in the case of circular orbits.

For the orbit control, a number of thrusters are arranged on the structure 20 of the satellite 10. A first high-power thruster PSP, for ensuring a transfer between the initial earth orbit (after release from the launch vehicle) and the final orbit, is positioned on the anti-earth face 23. According to the known state of the art, a first set of thrusters, comprising, for example, two thrusters 32 and 33 positioned on the north face and on the south face in proximity to the anti-earth face, is used to control the inclination. A second set of thrusters, such as, for example, the thrusters 34 and 35, positioned on the east and west faces, is used to control the eccentricity and the drift. It is also known that the control of the inclination requires around five to ten times more propellant than controlling the eccentricity and the drift. For this reason, the inclination control is generally performed by means of plasma thrusters, which consume less propellant, whereas the thrusters dedicated to controlling the eccentricity and the drift are more commonly chemical ergol thrusters.

As an example, a current satellite of dry weight 2500 kg and supporting a payload of 900 kg comprises a main thruster, two plasma thrusters for the inclination and the eccentricity, and four ergol thrusters for the eccentricity and the drift. Typically, 1700 kg of ergol are needed for the initial orbit transfer, and 220 kg of Xenon are needed to ensure the orbit control of the satellite for a mission duration of approximately 15 years. Thus, the cost and the weight of the current propulsion systems limit the capacity to install a high payload. It should also be noted that, in most of the known propulsion systems for orbit control, the various thrusters installed in fact comprise two propulsive motors positioned side-by-side, for mission safety and reliability reasons. This redundancy, well known to the person skilled in the art, is not represented in the figures but it is assumed hereinafter that a thruster may be made up of one or more propulsive engines forming a propulsive assembly, and of which the thrust which can be delivered is identical, in orientation or in intensity.

FIGS. 3a, 3b and 3c illustrate the principle of orbit control for a satellite according to the known state of the art. The structure 20 of the satellite 10 is represented in a side view, the east face being visible. The thruster 32 is linked to the north face of the structure 20 by means of a two-axis mechanism 40. The two-axis mechanism 40 allows for the rotation of the thruster 32 relative to the structure 20 on a first axis parallel to the axis Y and a second axis parallel to the axis X. In FIGS. 3a to 3c, the two-axis mechanism 40 is a cardan link produced by means of a first pivot link 41 with an axis parallel to the axis Y and a second pivot link 42 with an axis parallel to the axis X. The barycentre of the satellite, situated inside the parallelepipedal structure 20, is referenced CM.

In FIG. 3a, the orientation of the thruster 32 makes it possible to direct the thrust of the thruster towards the barycentre CM of the satellite. To perform an inclination correction manoeuvre, a technique known to the person skilled in the art consists in firing the thruster 32 a first time close to an orbital node, for example 15, and then the thruster on the opposite side a second time close to the opposite orbital node, 16 in the example. Thus, the thrust from the first firing of the thruster 32, oriented towards the barycentre CM, moves the satellite in a direction that has a Z component and a Y component. Twelve hours later, the thrust from the second firing at the opposite orbital node moves the satellite in a direction that has a Z component opposite to the first firing, and which compensates the unwanted effect on the eccentricity and a Y component, also opposite, but the wanted effects of which accumulate inclination-wise. Thus, two firings of equal intensities performed twelve hours apart close to the orbital nodes 15 and 16 make it possible to cancel the effect of the radial component so as to retain only a north-south correction. This known procedure allows for a daily correction of the inclination.

By the same technique, it is also possible, by applying a second thrust of different intensity from the first, to apply eccentricity corrections on an axis perpendicular to the line joining the two orbital nodes 15 and 16. Techniques have also developed to allow for eccentricity corrections on a second axis, by offsetting the firing of the thruster relative to the orbital node, but at the cost of less effective control of the inclination. To sum up, the known systems make it possible, by means of two thruster systems 32 and 33, to ensure the control of the inclination and the control of the eccentricity on an axis with no loss of optimisation of the inclination control, or to ensure the control of the inclination and the control of the eccentricity on two axes with a loss of optimisation of the inclination control. The drift cannot be controlled by these two thrusters. A current satellite comprises, for this, four chemical ergol nozzles positioned on the east and west faces of the satellite.

The thruster systems 32 and 33 are also used to manage the quantity of movement of the attitude control systems, as illustrated in FIGS. 3b and 3c. By applying a thrust outside of the barycentre CM—in a plane Y-Z in FIG. 3b and outside of the plane Y-Z in FIG. 3c, a rotational torque is generated on the satellite—a roll torque in FIG. 3b and a pitch and yaw torque in FIG. 3c. These two torques can be used to charge or discharge the inertia wheels on two axes. For example, when the speed of rotation of an inertia wheel reaches its limit speed, efforts will be made to orient the thrust deliberately away from the barycentre CM so as to generate, in addition to the desired movement of the satellite, a torque that makes it possible to desaturate the inertia wheel, or more generally, the problem will be anticipated by adjusting the kinetic moment to desired values at the time of each manoeuvre, these desired values obviously being able to be zero, but also a value shrewdly defined so as to anticipate the trend of the kinetic moment between two manoeuvres notably under the effect of the solar radiation pressure.

It should also be noted that the barycentre of the satellite varies during the life of the satellite, notably because of the gradual consumption of the onboard propellant. In the known systems, algorithms are implemented for the combined management of the attitude control and of the orbit control, and to make it possible to take into account the position of the barycentre CM throughout the life of the satellite.

The issue of being able to have effective propulsion systems will therefore be understood. The current solutions, which implement thrusters of different types at various points on the satellite are relatively complex and costly and are very heavy, which limits the payload capacity of the satellite.

SUMMARY OF THE INVENTION

The invention aims to propose an alternative solution for controlling the orbit and producing the torques to be exerted on the satellite during the manoeuvres while mitigating the implementation difficulties mentioned above.

To this end, the subject of the invention is a propulsion system for controlling the orbit of a satellite in earth orbit that has a kinetic moment accumulation capacity, and for the generation of torques helping to control the kinetic moment, said satellite being driven by a displacement velocity tangential to the earth orbit, characterized in that the propulsion system comprises a thruster suitable for delivering a force along an axis F, and a motor-driven mechanism linked on the one hand to the thruster and on the other hand to a structure of the satellite, said motor-driven mechanism being suitable for displacing the thruster on either side of the plane of the orbit and suitable for orienting the thruster so as to make it possible to control a component perpendicular to the orbit of the force in two opposite directions, to control the inclination of the satellite, and in that said motor-driven mechanism is suitable for displacing the thruster along an axis V parallel to the velocity of the satellite, and suitable for orienting the thruster so as to make it possible to control: a component of the force on the axis V, to control orbit, and an amplitude and a direction of torque in a plane perpendicular to the axis F, to control the kinetic moment; the duly configured propulsion system making it possible to control six orbital parameters of the satellite.

The invention also relates to a satellite in earth orbit provided with a propulsion system having the characteristics described above, characterized in that it comprises a parallelepipedal structure, and in that the thruster and the motor-driven mechanism are held, in a storage configuration, against one of the faces of the structure of the satellite; the thruster and the motor-driven mechanism being released then reoriented in an operational configuration.

The invention finally relates to a satellite in earth orbit provided with a propulsion system having the characteristics described previously, characterized in that the propulsion system is, in a configuration suited to orbit transfer, positioned and oriented in such a way that the force delivered by the thruster generates a thrust on the satellite in a desired direction and a controlled torque; the purpose of the torque generation being to assist in controlling the attitude of the satellite or in controlling the kinetic moment of the satellite.

BRIEF DESCRIPTION OF THE DRAWINGS

The invention will be better understood and other advantages will become apparent on reading the detailed description of the embodiments given by way of example in the following figures.

In the interests of clarity, the same elements will bear the same references in the different figures.

DETAILED DESCRIPTION

Figure 4A:
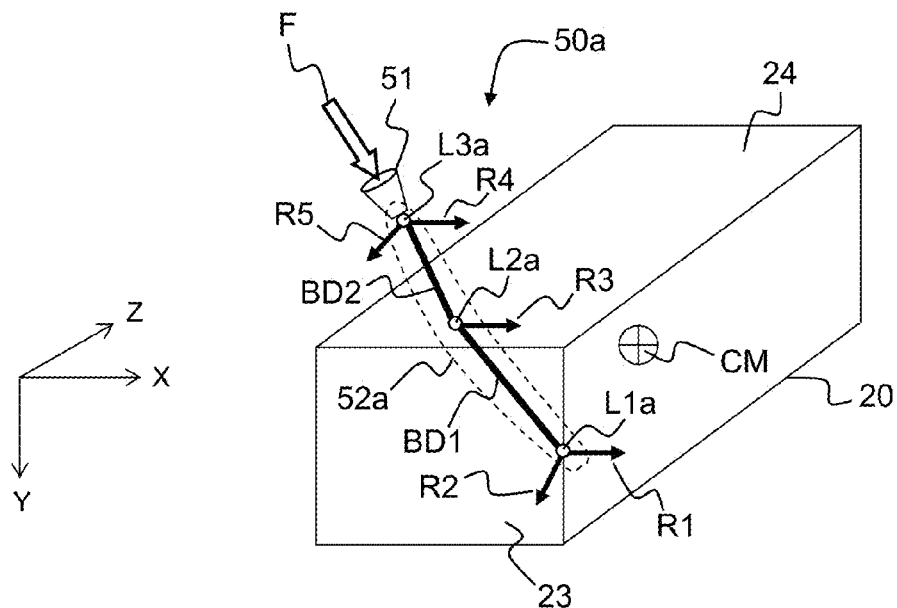
FIGS. 4a, 4b and 4c represent three variants of a propulsion system according to the invention.
Figure 4B:
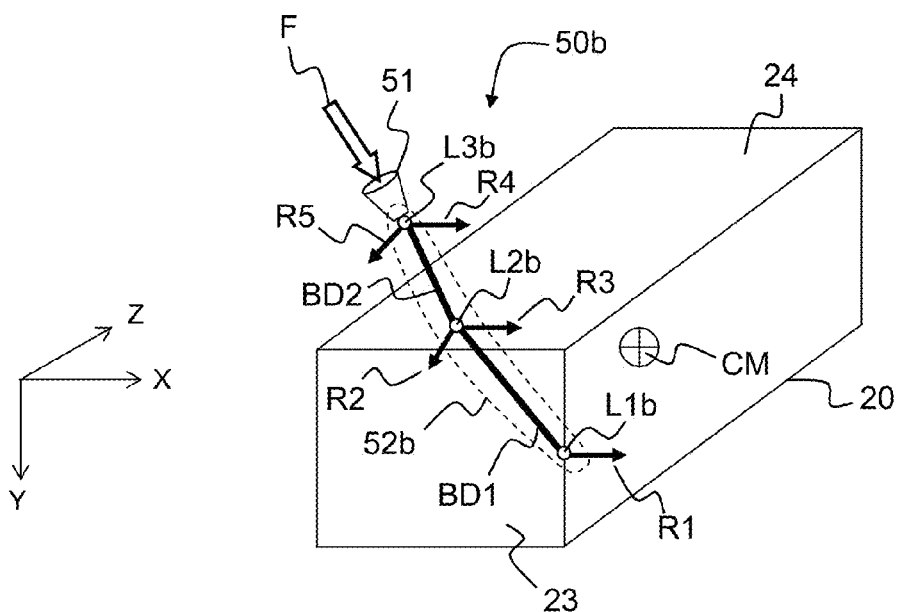
Figure 4C:
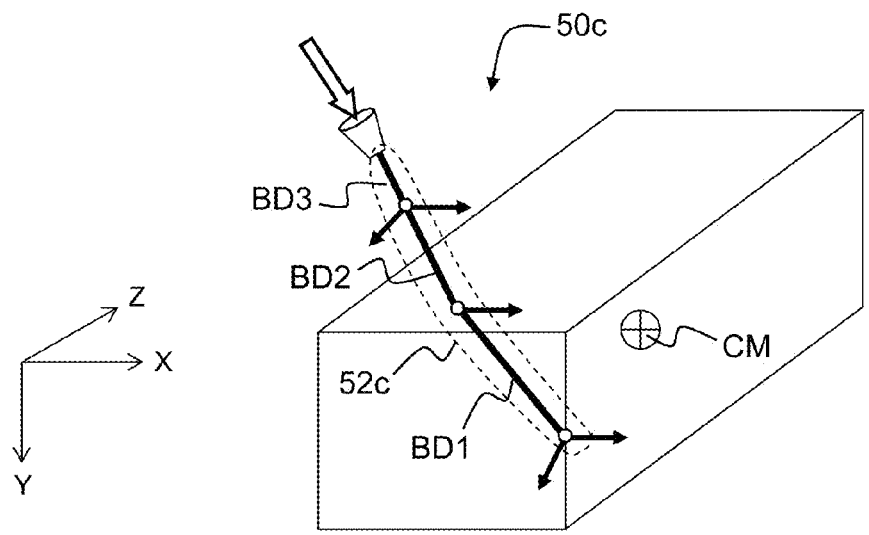

FIGS. 4a, 4b and 4c represent three variants of a propulsion system according to the invention. As described previously, a satellite 10 in orbit 11 is stabilized on three axes of a reference trihedron linked to the satellite by means of an attitude control system. The reference trihedron comprises an axis Z oriented towards the earth, an axis Y perpendicular to the orbit and oriented in the direction opposite to the kinetic moment of the orbital rotation, and an axis X forming, with the axes Y and Z, a direct orthogonal reference frame. The axis X is oriented in the direction of the velocity of the satellite in orbit 11 around the earth 12. The satellite 10 comprises a parallelepipedal structure 20 with two faces 22 and 23, called earth face and anti-earth face, which are perpendicular to the axis Z and oriented respectively towards the earth and towards a direction opposite to the earth, and to opposite adjacent faces 24 and 25, called north face and south face, which are perpendicular to the axis Y and oriented respectively towards the north and the south in the earth's magnetic field. A barycentre CM of the satellite will also be noted, the position of which varies slightly during the life of the satellite, situated inside the structure 20.

For the purposes of clarity, the description of the invention relies on the reference frame formed by the axes X, Y and Z, and on a satellite with a structure 20 which is parallelepipedal. The invention is in no way limited to a satellite with a structure 20 which is parallelepipedal, or to a satellite stabilised on the three axes X, Y and Z. It extends generally to any satellite 10 in earth orbit 11 having a kinetic moment accumulation capacity, driven with a displacement velocity tangential to the earth orbit 11. Hereinbelow, the axis of the velocity is referenced axis V.

In a first variant of the invention, as described by FIG. 4a, a propulsion system 50a comprises a thruster 51 suitable for delivering a force on an axis F having a component perpendicular to the orbit 11, that is to say on the axis Y in the figure, and a motor-driven mechanism 52a linked on the one hand to the thruster 51 and on the other hand to a structure 20 of the satellite 10.

Advantageously, the motor-driven mechanism (52a) comprises a plurality of components linked together, and positioned in series between the structure 20 of the satellite 10 and the thruster 51 in the following order:

a first motor-driven link L1a, allowing a rotation about an axis R1 substantially parallel to the axis V, and a rotation about an axis R2 substantially perpendicular both to the axis V and to the axis F,
  a first rigid offset arm BD1,
  a second motor-driven link L2a, allowing a rotation about an axis R3 substantially parallel to the axis V,
  a second offset arm BD2,
  a third motor-driven link L3a, allowing a rotation about an axis R4 substantially parallel to the axis V, and a rotation about an axis R5 substantially perpendicular to the axis F and to the axis V.

In a second variant of the invention, as described by FIG. 4b, a propulsion system 50b comprises a thruster 51 suitable for delivering a force on an axis F having a component perpendicular to the orbit 11, that is to say on the axis Y in the figure, and a motor-driven mechanism 52b linked on the one hand to the thruster 51 and on the other hand to a structure 20 of the satellite 10.

Advantageously, the motor-driven mechanism 52b comprises a plurality of components linked together, and positioned in series between the structure 20 of the satellite 10 and the thruster 51 in the following order:
- a first motor-driven link L1b, allowing a rotation about an axis R1 substantially parallel to the axis V,
- a first rigid offset arm BD1,
- a second motor-driven link L2b, allowing a rotation about an axis R3 substantially parallel to the axis V, and a rotation about an axis R2 substantially perpendicular to both the axis V and the axis F,
- a second rigid offset arm BD2,
- a third motor-driven link L3b, allowing a rotation about an axis R4 substantially parallel to the axis V, and a rotation about an axis R5 substantially perpendicular to the axis F and to the axis V.

In a third variant of the invention, as described by FIG. 4c, a propulsion system 50c comprises a thruster 51 and a motor-driven mechanism 52c. Advantageously, the mechanism 52c comprises the same components as the motor-driven mechanism 52a or 52b, described respectively in FIGS. 4a and 4b, and also comprises a third offset arm BD3 linking the third motor-driven link, L3a or L3b, and the structure 20 of the satellite 10. In other words, the third motor-driven link, L3a or L3b, is linked to the thruster 51 via a third rigid offset arm BD3.

For these variants of the invention, various mechanisms can be implemented to produce the motor-driven links L1a, L1b, L2a, L2b, L3a or L3b. A non-exhaustive list comprises in particular motor-driven cardan links, or two-axis mechanisms, motor-driven pivot links. The offset arms BD1, BD2 and BD3 can be of substantially longilinear form as represented in FIGS. 4a to 4c, or may comprise a succession of several substantially longilinear rods linked together by elbow joints. As mentioned previously, a thruster 51 may also comprise two propulsive engines for safety and reliability reasons.

Figure 1:
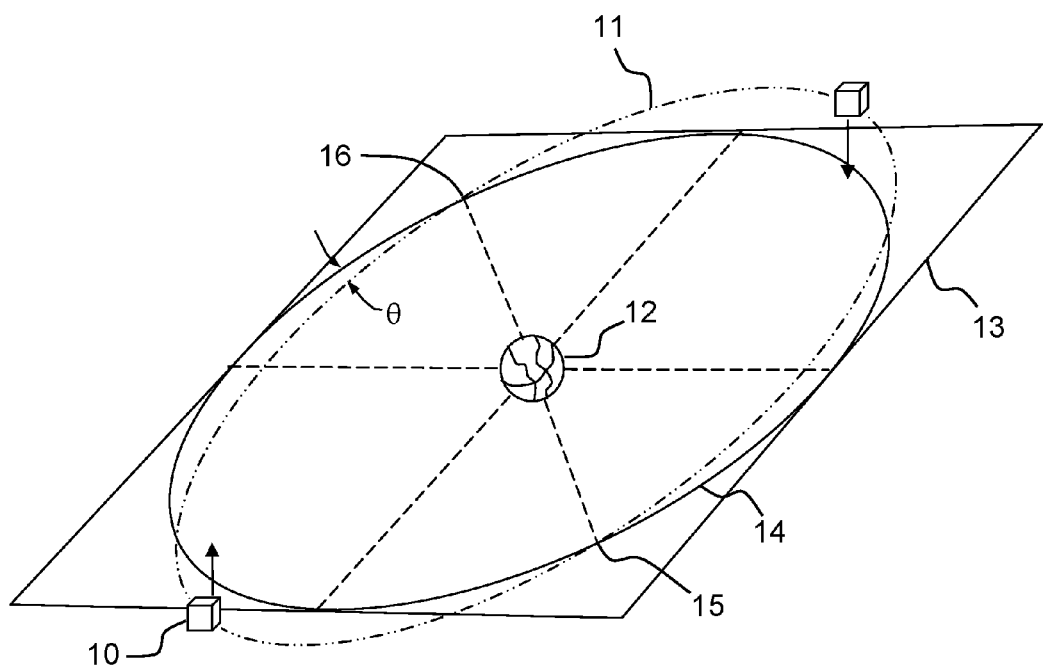
FIG. 1, already described, represents a geostationary satellite in orbit around the earth, FIG. 2, already described, represents a current architecture of a satellite comprising a structure on which are fastened various devices useful to the piloting of the satellite and to its mission, FIGS. 3a, 3b and 3c, already described, illustrate the principle of orbit control for a satellite according to the known state of the art.
Figure 2:
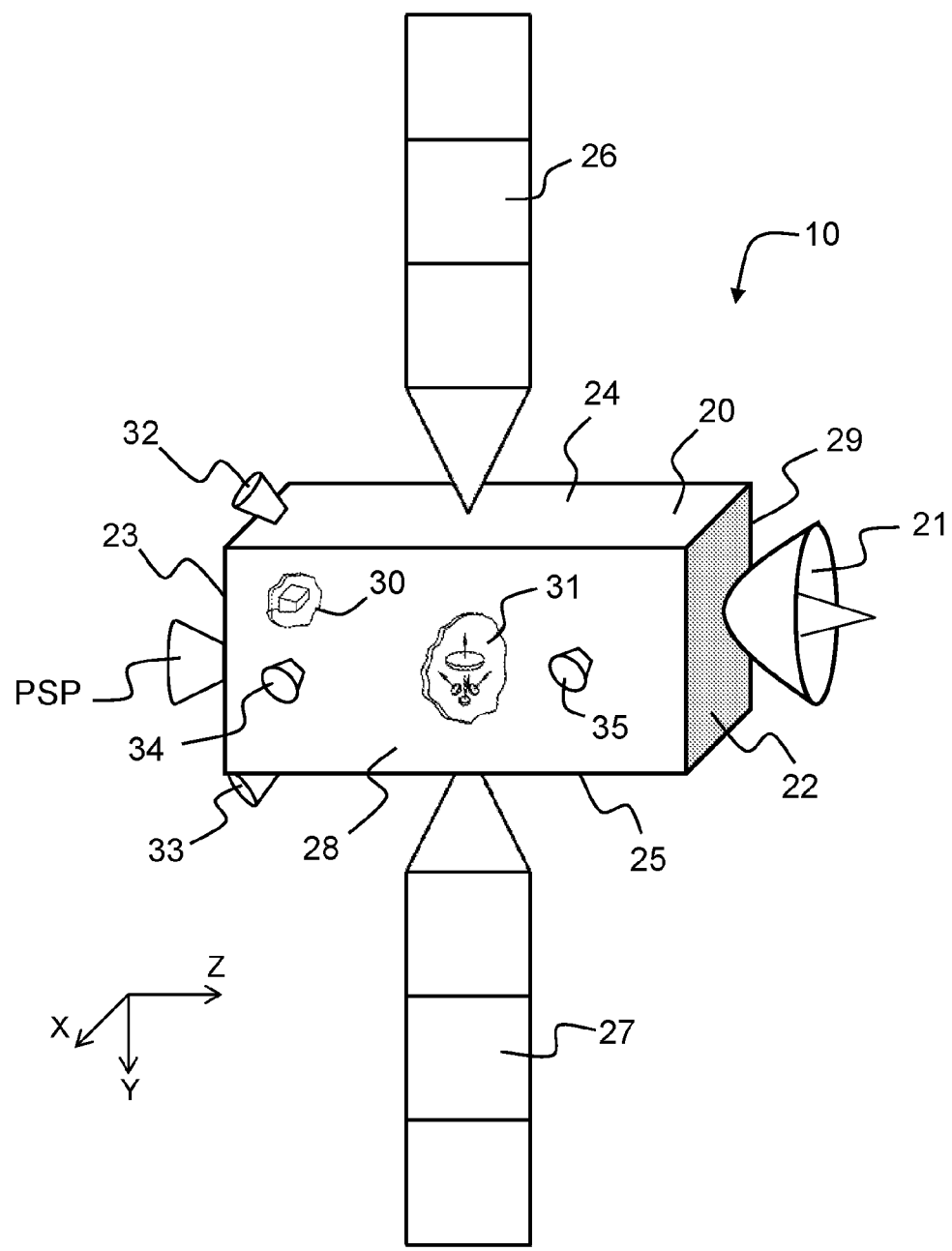
Figure 3A:
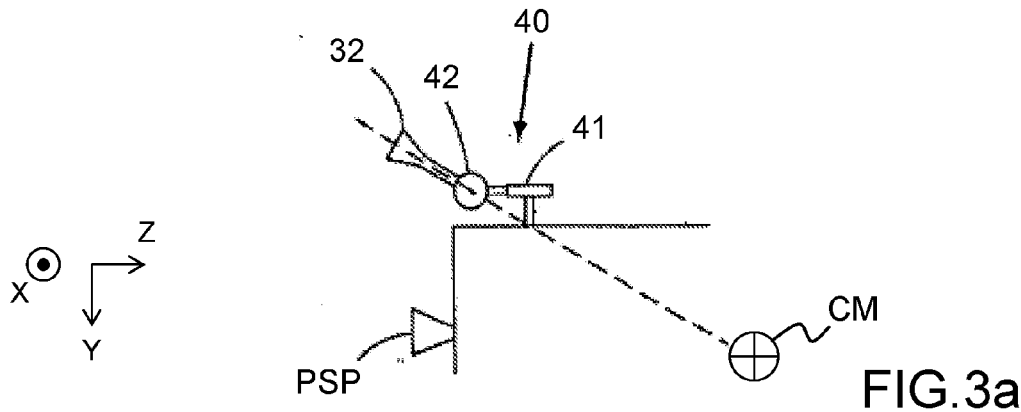
Figure 3B:
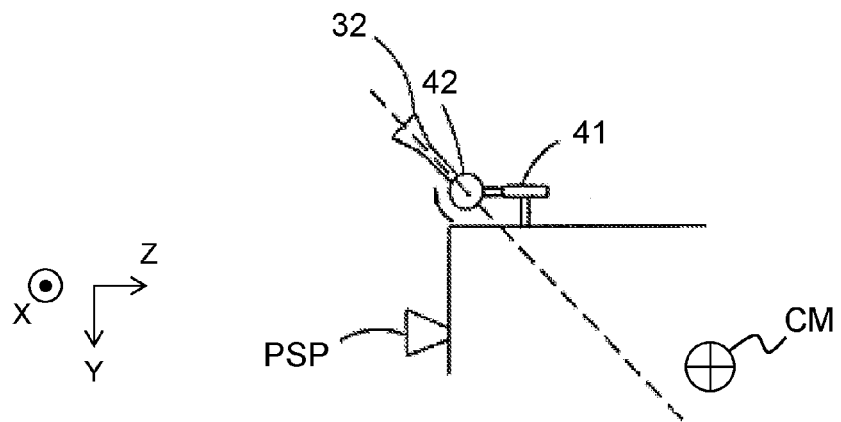
Figure 3C:
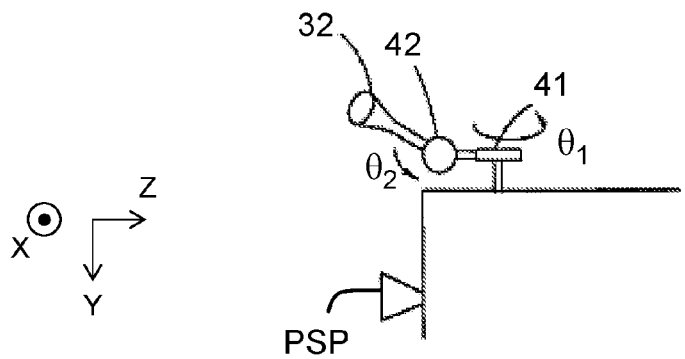

In an operational phase of the satellite, the satellite 10 being in orbit 11 about the earth 12, the thruster 51 linked to the motor-driven mechanism 52a, 52b or 52c, according to any one of the three variants of the invention, can be displaced and oriented by means of the motor-driven links. In particular, it is possible to position the thruster 51 in a plane perpendicular to the axis X containing the barycentre CM, and to orient its thrust towards the barycentre CM. In this configuration, the propulsion system is functionally equivalent to the known systems described by FIGS. 3a, 3b and 3c in a perfect case of knowledge of the barycentre and alignments; by applying a thrust close to the orbital nodes 15 and 16, it makes it possible to control the inclination and the eccentricity on an axis with no loss of optimization of the inclination control, or to control the inclination and the eccentricity on two axes with a loss of optimization of the inclination control. The motor-driven mechanism 52, 52b, 52c or 52d also makes it possible to position the thruster 51 outside of a plane perpendicular to the axis X containing the barycentre CM, and to orient its thrust towards the barycentre CM. In this configuration, the propulsion system 50 makes it possible to apply a thrust on the barycentre CM that has a desired X component, that is to say according to the velocity, in addition a Y and/or Z component. This feature is particularly advantageous because it makes it possible to give the propulsion system 50 the capacity to control the orbit in drift and eccentricity, or, in other words, the capacity to correct the position of the satellite on the axis X, towards the east or towards the west. Similarly, according to the techniques known to the person skilled in the art, the propulsion system makes it possible, by orienting the force of the thruster along an axis that does not pass through the barycentre CM, to generate a torque to control the kinetic moment of the satellite.

Another particularly attractive feature of the propulsion system 51 is that it makes it possible to displace the thruster 51 on either side of the plane of the orbit 11. Thus, it is possible, by a firing of the thruster 51 positioned on the north side of the plane of the orbit 11, to apply a thrust that has a positive Y component. Similarly, it is possible, by a firing of the thruster 51 positioned on the south side of the plane of the orbit 11, to apply a thrust that has a negative Y component. Advantageously, a single propulsion system 50 according to the invention therefore allows for complete orbit control, that is to say control of the six orbital parameters.

According to various constraints, of integration on the satellite, of cost, or even of weight, various variants of the propulsion system, notably the three variants described above, can be envisaged according to the invention.

These variants of the propulsion system have in common a thruster 51 suitable for delivering a force along an axis F, and a motor-driven mechanism, 52a, 52b, or 52c, linked on the one hand to the thruster 51 and on the other hand to the structure 20 of the satellite 10, said motor-driven mechanism, 52a, 52b or 52c, being suitable for displacing the thruster 51 on either side of the plane of the orbit 11 and suitable for orienting the thruster 51 so as to make it possible to control a component perpendicular to the orbit 11 of the force in two opposite directions, to control the inclination of the satellite. The motor-driven mechanism, 52a, 52b or 52c, is suitable for displacing the thruster 51 along an axis V parallel to the velocity of the satellite 10, and suitable for orienting the thruster 51 so as to make it possible to control:
- a component of the force on the axis V, to control orbit,
- an amplitude and a direction of torque in a plane perpendicular to the axis F, to control the kinetic moment;

the duly configured propulsion system, 50a, 50b or 50c making it possible to control six orbital parameters of the satellite 10.

Figure 5A:
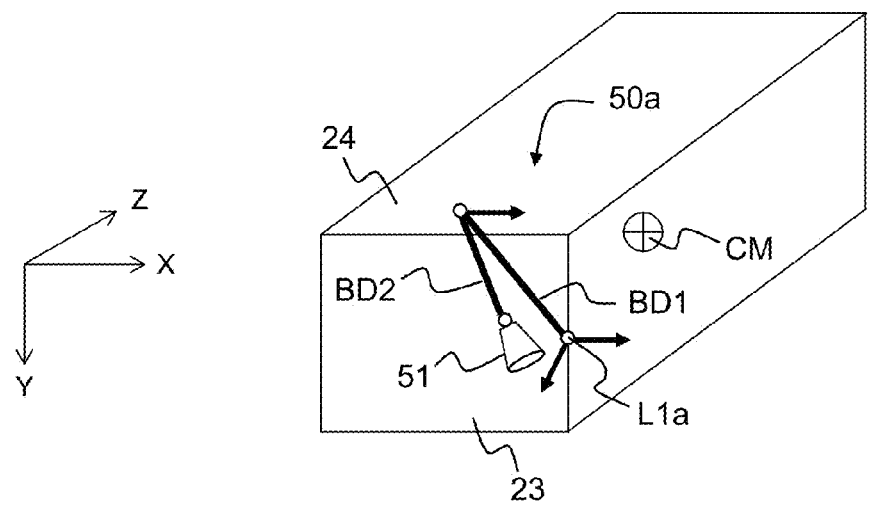
FIGS. 5a and 5b represent a propulsion system in storage configuration according to two embodiments of the invention.
Figure 5B:
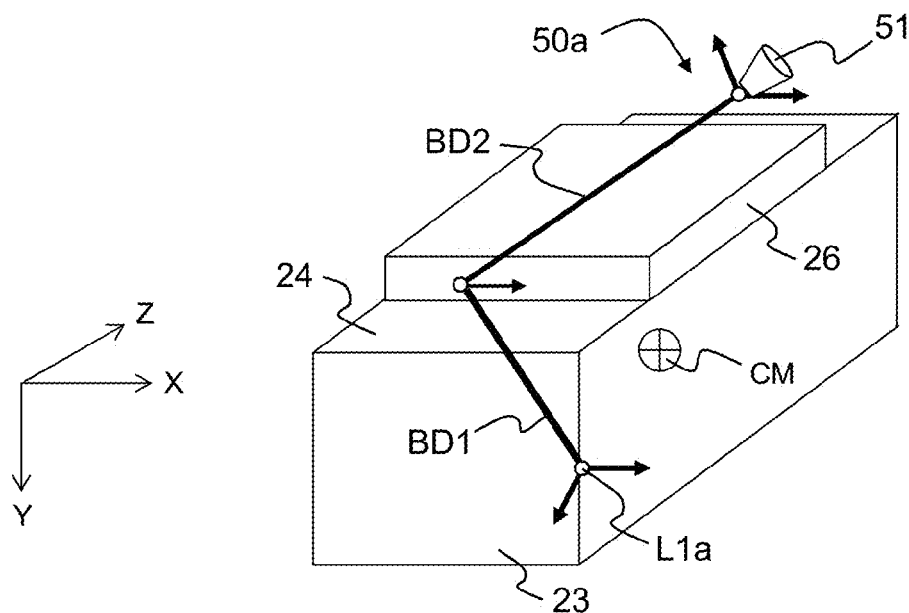

FIGS. 5a and 5b represent a propulsion system in storage configuration according to two embodiments of the invention. The propulsion system represented in FIGS. 5a and 5b corresponds to the first variant of the invention, that is to say that it is identical to the propulsion system 50a described in FIG. 4a. The invention would, similarly, be applied to a propulsion system 50b or 50c for the two storage configuration embodiments described below.

In a launch phase via a space launch vehicle, the propulsion system 50a is, in a storage configuration, suitable for holding the thruster 51 and the motor-driven mechanism 52a against at least one of the faces of the structure 20 of the satellite 10, to keep it within the volume limited by the fairing of the launch vehicle, and protect it from the strong acceleration and vibration stresses associated with the launch. In a subsequent operational phase, the thruster 51 and the motor-driven mechanism 52a are released and positioned in operational configuration, for example as represented in FIG. 4a.

FIG. 5a represents a propulsion system 50a in storage configuration according to a first embodiment. In the case of a satellite comprising a parallelepipedal structure 20, the thruster 51 and the motor-driven mechanism 52a are held, in a storage configuration, against at least one of the faces of the structure 20 of the satellite 10. The thruster 51 and the motor-driven mechanism 52a are released then reoriented in an operational configuration.

Advantageously, the first motor-driven link L1a is fastened close to the middle of an edge of the structure 20, and the first and second offset arms, BD1 and BD2, are held in storage configuration against a face of the structure 20 adjacent to this edge, for example the anti-earth face 23 in the figure. This first embodiment advantageously allows for a simple and non-bulky storage of the propulsion system.

FIG. 5b represents a propulsion system 50a in storage configuration according to a second embodiment. In the case of a satellite comprising a parallelepipedal structure 20, the thruster 51 and the motor-driven mechanism 52a are held, in a storage configuration, against at least one of the faces of the structure 20 of the satellite 10. The thruster 51 and the motor-driven mechanism 52a are released then reoriented in an operational configuration.

Advantageously, the first motor-driven link L1a is fastened close to the middle of an edge of the structure 20. The first offset arm BD1 is held in storage configuration against a first face of the structure 20 adjacent to this edge, for example the anti-earth face 23 in the figure. The second offset arm BD2 and the thruster 51 are held in storage configuration against a second face of the structure 20, adjacent to the first face, for example the north face 24 in the figure.

In a current satellite architecture, the solar panels 26 and 27 are, in storage configuration, folded down and held respectively against the north 24 and south 25 faces. In the figure, the propulsion system, fastened to the anti-earth face 23, is held in storage configuration on the one hand against the anti-earth face 23 for the offset arm BD1 and on the other hand against the north face 24 for the offset arm BD2 and the thruster 51, the propulsion system being configured so as to insert, in storage configuration, the solar panels 26 between the north face 24 of the structure 20 and the offset arm BD2 of the propulsion system.

This second embodiment further enhances the effectiveness of the inclination control, by allowing for the storage of a second offset arm BD2 of large size suitable for positioning and orienting the thruster so as to deliver a thrust on the barycentre CM whose component along the axis Y is very much greater than the components along the axes X and Z.

Various devices for holding the propulsion system in storage configuration are envisaged according to the invention; in particular pyrotechnic devices are envisaged.

Advantageously, the motor-driven mechanism, 52a, 52b, 52c, of the propulsion system 50a, 50b, 50c according to the invention, comprises ducts for supplying propellant from the structure 20 of the satellite 10 to the thruster 51, and/or means for supplying electrical energy to the thruster 51 and the motor-driven mechanism 52. The thruster 51 can be of chemical type or of electrical type. For a chemical thruster, the ducts convey a chemical propellant of ergol or propergol type; for an electrical thruster, the ducts convey a propellant of xenon or krypton type.

Figure 6:
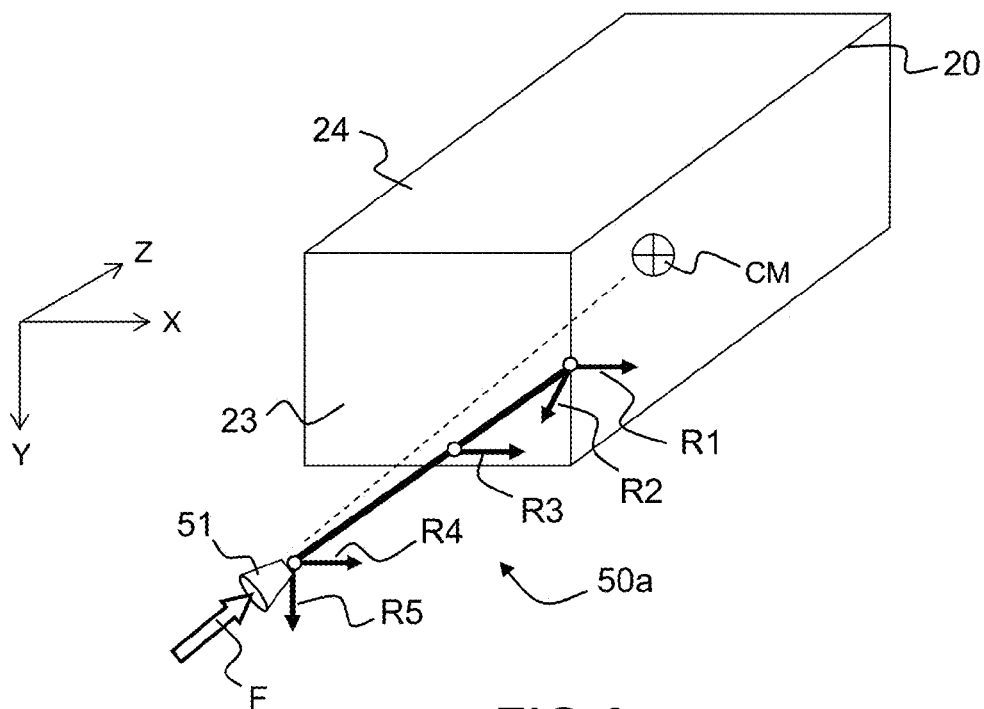
FIG. 6 represents a propulsion system in a configuration suited to orbit transfer.

FIG. 6 represents a propulsion system in a configuration suited to orbit transfer. The propulsion system represented in FIG. 6 corresponds to the first variant of the invention, that is to say that it is identical to the propulsion system 50a described in FIG. 4a. The invention could be applied, similarly, to a propulsion system 50b or 50c. After the satellite is released from the space launch vehicle to a transfer orbit, the propulsion system according to the invention is implemented to transport the satellite to its final orbit.

Thus, in a configuration suited to orbit transfer, the propulsion system 50a is, as described in FIG. 6, positioned and oriented in such a way that the force delivered by the thruster 51 generates a thrust on the satellite in a desired direction and a controlled torque, the purpose of the torque generation being to assist in controlling the attitude of the satellite or in controlling the kinetic moment of the satellite. For example, the thruster is oriented so as to deliver a thrust parallel to the axis Z and oriented towards the barycentre CM.

In a particularly advantageous implementation of the invention, it will be possible to dispense with a main thruster of ergol type for the orbit transfer, as in the known systems; the orbit transfer being entirely handled by the propulsion system according to the invention.

The invention also relates to a satellite in earth orbit, and more particularly geostationary orbit, provided with a propulsion system that has the features described previously. It relates notably to a satellite with parallelepipedal structure.

Figure 7:
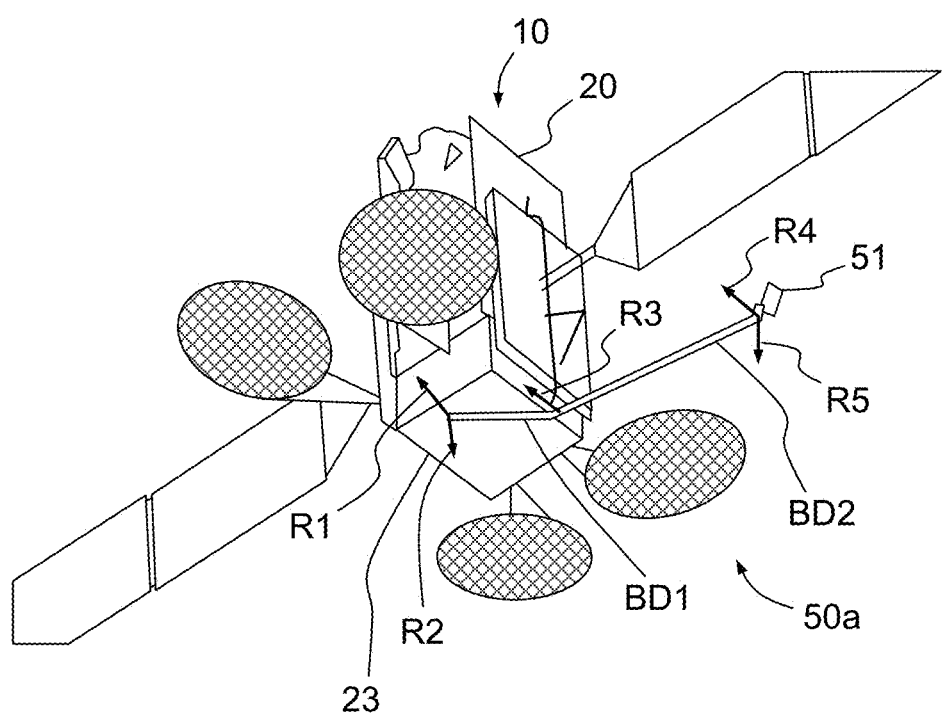
FIG. 7 represents a perspective view of a satellite provided with propulsion systems in a preferred implementation of the invention.

FIG. 7 represents a perspective view of a satellite provided with propulsion systems according to the invention in a preferred implementation of the invention. A propulsion system 50a is fastened to the anti-earth face 23 of the structure 20 of a satellite 10. The propulsion system 50a is represented in deployed operational configuration.

The invention claimed is:

1. A propulsion system for controlling the orbit of a satellite in earth orbit that has a kinetic moment accumulation capacity, and for the generation of torques helping to control the kinetic moment, said satellite being driven by a displacement velocity tangential to the earth orbit, the propulsion system comprising:
   a thruster for delivering a force along an axis F, and a motor-driven mechanism linked at a first end to the thruster and at a second end to a structure of the satellite,
   said motor-driven mechanism configured to displace the thruster on either side of the plane of the orbit and configured to orient the thruster so as to make it possible to control a component of the force perpendicular to the orbit in two opposite directions, to control the inclination of the satellite,
   said motor-driven mechanism configured to displace the thruster along an axis V parallel to the velocity of the satellite, and configured to orient the thruster so as to make it possible to control:
   a component of the force on the axis V, to control orbit,
   an amplitude and a direction of torque in a plane perpendicular to the axis F, to control the kinetic moment;
   wherein the propulsion system can control six orbital parameters of the satellite, and the motor-driven mechanism includes:
   (i) at least five axes of rotation between the structure of the satellite and the thruster,
   (ii) at least two rigid offset arms, and
   (iii) at least three motor-driven links interconnecting said at least two rigid offset arms with said thruster, and
   wherein at least two of the motor-driven links allow rotation about two axes of rotation.

2. The propulsion system according to claim 1, wherein the at least two rigid offset arms and the at least three motor driven links are positioned in series between the structure of the satellite and the thruster in the following order:
   a first motor-driven link, allowing a rotation about an axis (R1) substantially parallel to the axis V,
   a first rigid offset arm, a second motor-driven link, allowing a rotation about an axis (R3) substantially parallel to the axis V, and a rotation about an axis (R2) substantially perpendicular to both the axis V and the axis F, a second rigid offset arm, a third motor-driven link, allowing a rotation about an axis (R4) substantially parallel to the axis V, and a rotation about an axis (R5) substantially perpendicular to the axis F and to the axis V.

3. The propulsion system according to claim 1, wherein the motor-driven mechanism comprises means for supplying energy from the structure of the satellite to the thruster and/or the motor-driven mechanism.

4. The satellite in earth orbit provided with a propulsion system according to claim 1, wherein the propulsion system is, in a configuration suited to orbit transfer, positioned and oriented in such a way that the force delivered by the thruster generates a thrust on the satellite in a desired direction and a controlled torque; the purpose of the torque generation being to assist in controlling the attitude of the satellite or in controlling the kinetic moment of the satellite.

5. The propulsion system according to claim 1, wherein the at least two rigid offset arms and the at least three motor driven links are positioned in series between the structure of the satellite and the thruster in the following order:

a first motor-driven link, allowing a rotation about an axis (R1) substantially parallel to the axis V, and a rotation about an axis (R2) substantially perpendicular both to the axis V and to the axis F, a first rigid offset arm, a second motor-driven link, allowing a rotation about an axis (R3) substantially parallel to the axis V, a second offset arm, a third motor-driven link, allowing a rotation about an axis (R4) substantially parallel to the axis V, and a rotation about an axis (R5) substantially perpendicular to the axis F and to the axis V.

6. The propulsion system according to claim 5, wherein the third motor-driven link is linked to the thruster via a third rigid offset arm.

7. A satellite in earth orbit provided with a propulsion system according to claim 1, further comprising a parallel-epipedal structure, and the thruster and the motor-driven mechanism are held, in a storage configuration, against one of one or more faces of the structure of the satellite; the thruster and the motor-driven mechanism being released then reoriented in an operational configuration.

8. The satellite in earth orbit according to claim 7, wherein a first motor-driven link is fastened proximate to a middle of an edge of the structure, and first and second offset arms are held in storage configuration against a face of the structure adjacent to this edge.

9. The satellite in earth orbit according to claim 8, wherein the first offset arm is held in storage configuration against a first face of the structure, adjacent to this edge, and the second offset arm and the thruster are held in storage configuration against a second face of the structure, adjacent to the first face.

10. The propulsion system according to claim 1, wherein the at least three motor driven links comprise:

a first motor-driven link, allowing a rotation about an axis substantially parallel to the axis V, and a rotation about an axis substantially perpendicular both to the axis V and to the axis F, a second motor-driven link, allowing a rotation about an axis substantially parallel to the axis V, a third motor-driven link, allowing a rotation about an axis substantially parallel to the axis V, and a rotation about an axis substantially perpendicular to the axis F and to the axis V.

11. The propulsion system according to claim 10, wherein the motor-driven mechanism comprises a first rigid offset arm connecting the first and second motor-driven links and a second offset arm connecting the second and the first motor-driven links.

* * * * *